United States Patent [19]
Gurantz et al.

[11] Patent Number: 5,550,869
[45] Date of Patent: Aug. 27, 1996

[54] DEMODULATOR FOR CONSUMER USES

[75] Inventors: Itzhak Gurantz, San Diego, Calif.;
Yoav Goldenberg, Kiryat Haim, Israel;
Sree A. Raghavan, San Diego, Calif.

[73] Assignee: Comstream Corporation, San Diego, Calif.

[21] Appl. No.: 998,300

[22] Filed: Dec. 30, 1992

[51] Int. Cl.$^6$ .............................. H03D 1/00; H04L 27/06
[52] U.S. Cl. ........................ 375/340; 375/345; 329/306
[58] Field of Search ................................ 375/94, 97, 80, 375/118, 39, 98; 329/306, 307; 455/324

[56] References Cited

U.S. PATENT DOCUMENTS

| | | | |
|---|---|---|---|
| 4,879,728 | 11/1989 | Tarallo | 329/306 |
| 4,888,793 | 12/1989 | Chanroo et al. | |
| 5,001,727 | 3/1991 | McDavid | 329/306 |
| 5,159,710 | 10/1992 | Cusdin | 455/324 |
| 5,280,538 | 1/1994 | Kataoka et al. | 329/307 |
| 5,302,950 | 4/1994 | Johnson et al. | 341/123 |
| 5,317,602 | 5/1994 | Onoda et al. | 375/118 |

FOREIGN PATENT DOCUMENTS

| | | |
|---|---|---|
| 0449146 | 12/1991 | European Pat. Off. . |
| 0481543 | 4/1992 | European Pat. Off. . |

OTHER PUBLICATIONS

"Digital Communication" Edward Lee and David Messerschmitt pp. 184–186, 1988.

Mueller et al., "Timing Recovery in Digital Synchronous Data Receivers," *IEEE Transactions on Communications*, vol. COM-24, May 1976, pp. 516–531.

Jennings et al., "Data-Sequence Selective Timing Recovery for PAM Systems," *IEEE Transactions on Communications*, vol. COM-33, No. 07, Jul. 1985, pp. 729–731.

Volder et al., "The CORDIC Trigonometric Computing Technique," *IRE Transactions on Electronic Computers*, Sep. 1959, pp. 330–334.

Agrawal et al., "Design Methodology for ΣΔM," *IEEE Transactions on Communications*, vol. COM-31, No. 3, Mar. 1983, pp. 360–369.

Mileant et al., "Lock Detection in Costas Loops," *IEEE Transactions on Communications*, vol. 40, No. 3, Mar. 1992, pp. 480–483.

*Primary Examiner*—Stephen Chin
*Assistant Examiner*—T. Ghebretinsae
*Attorney, Agent, or Firm*—Lowe, Price, LeBlanc & Becker

[57] ABSTRACT

A demodulator responsive to a symbol containing analog signal includes a pair of relatively inexpensive analog-to-digital converters for sampling I and Q channels of the signal only once per symbol. A derotator responsive to outputs of the converters and a digital signal representing frequency and phase corrections for an input to the demodulator operates in accordance with a CORDIC function to derive I and Q channel digital signals that are compensated by the corrections. A digital phase shifter responsive to at least one of the digital I and Q signals controls when the input is sampled by the converter.

61 Claims, 7 Drawing Sheets

DEMODULATOR FOR CONSUMER USES

FIELD OF INVENTION

The present invention relates generally to receivers and demodulators employing digital processing responsive to symbol containing analog signals and more particularly to such devices including at least one of: (a) relatively inexpensive analog-to-digital converter means for sampling the signal only once per symbol, (b) a derotator operating in accordance with a CORDIC function, and (c) a digital derotator for deriving a digital signal representing frequency and phase corrections for an input to the demodulator in combination with a digital phase shifter for controlling when the input is sampled by an analog-to-digital converter.

BACKGROUND ART

Figure 1:
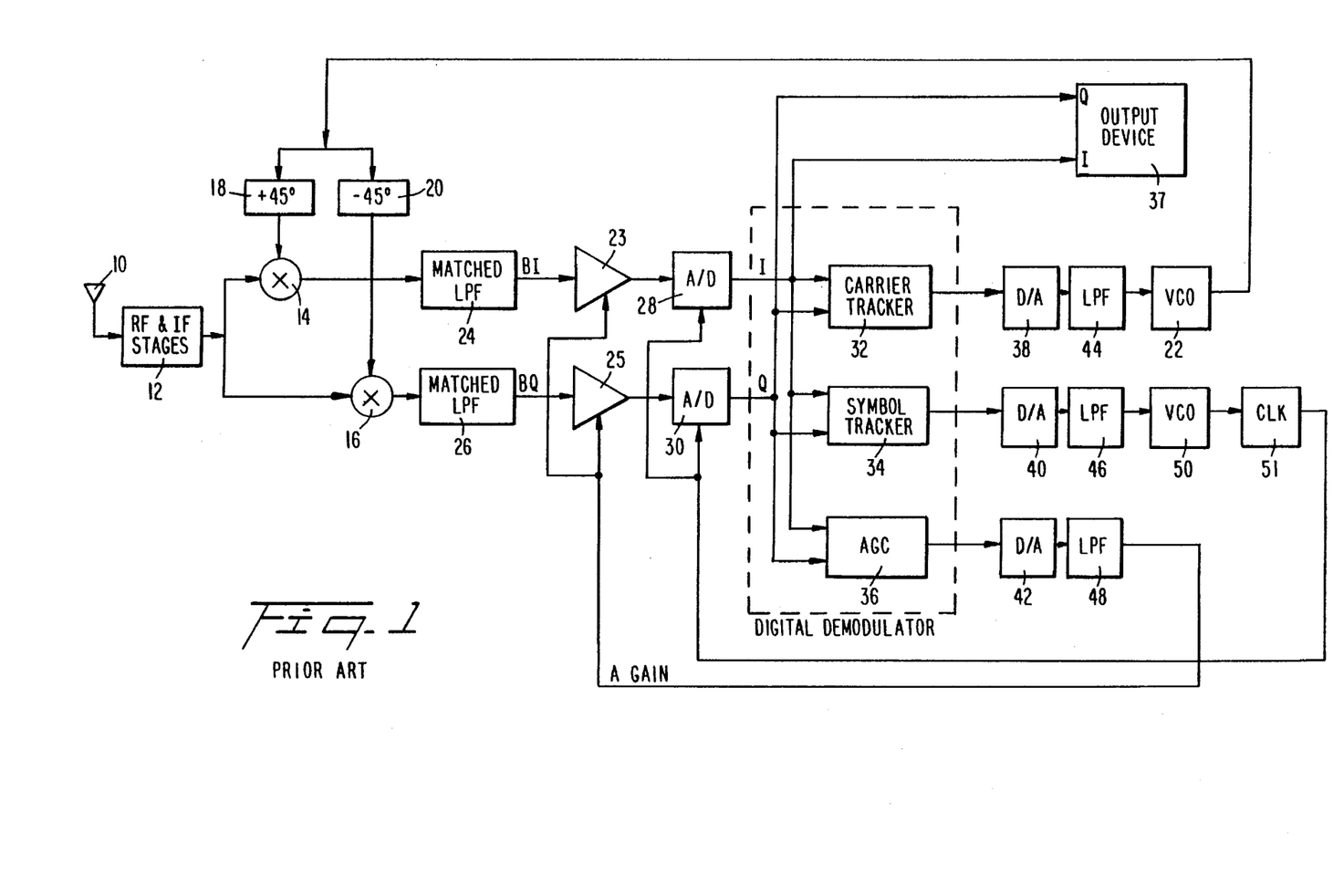
FIG. 1, as previously indicated, is a block diagram of a prior art phase shift key receiver and demodulator employing digital processing circuitry.

FIG. 1 is a block diagram of a prior art phase shift key receiver employing digital processing. The receiver is responsive to a noise ladened suppressed carrier quadrature phase shift key (QPSK) modulated electromagnetic wave incident on antenna 10. The wave incident on antenna 10 is transduced into an electrical signal that is amplified by RF and IF stages 12. The wave has a precisely controlled carrier frequency determined at an electromagnetic wave QPSK transmitter and includes symbols having a predetermined rate, i.e., frequency, e.g., 20 mHz.

The output signal of stages 12 is applied in parallel to mixers 14 and 16, also respectively responsive to mutually orthogonal oscillations derived by ±45° phase shifters 18 and 20. Phase shifters 18 and 20 are in turn responsive to voltage controlled variable frequency local oscillator 22, having an output frequency approximately equal to the suppressed carrier frequency derived from stages 12. The resulting outputs of mixers 18 and 20 are respectively applied to matched (to the transmitter waveform) low-pass filters 24 and 26 which derive variable analog baseband signals representing symbols to be processed into intelligence representing output signals. The baseband output signals of filters 24 and 26 are typically referred to as I and Q channel signals.

The I and Q channel signals derived by filters 24 and 26 are respectively applied via variable gain amplifiers 23 and 25 to analog-to-digital converters 28 and 30, operated to sample the baseband I and Q signal amplitudes at a variable frequency, typically approximately twice the symbol frequency. The gains of amplifiers 23 and 25 are controlled so that the maximum amplitude of the analog signals supplied to converters 28 and 30 equals the optimal range which the converters can handle. In normal operation, converters 28 and 30 sample the I and Q channel signals supplied to them twice per symbol, approximately in the center and between adjacent symbols. Converters 28 and 30 derive multibit digital output signals representing the magnitude and polarity of each sample applied to the converters. Converters 28 and 30, included on separate integrated circuit chips, are relatively expensive because they must sample the baseband I and Q channel analog signals at a frequency of approximately 40 mHz.

The I and Q representing digital signals derived by converters 28 and 30 are applied in parallel to carrier tracker 32, symbol tracker 34 and amplitude tracker 36, all of which are digital processing circuits included on a single custom integrated circuit chip. Carrier tracker 32 derives a digital signal having a value representing the polarity and magnitude of the frequency and phase differences between the output of oscillator 22 and the suppressed carrier output of stages 12. Symbol tracker 34 derives a digital signal having a value representing the polarity and magnitude of an error in the sampling times of converters 28 and 30 relative to idealized positions for these sampling times. Amplitude tracker 36 responds to the I and Q outputs of converters 28 and 30 and a reference value for the optimal amplitude at which the converters should operate to derive a control signal for variable gain amplifiers 23 and 25. The I and Q output signals of converters 28 and 30 are also applied to output processing circuit 37. Typically, the digital signals have eight to ten bits, particularly to provide necessary resolution for control of amplifiers 23 and 25.

The digital signals derived by trackers 32, 34 and 36 are respectively applied to digital to analog converters 38, 40 and 42, having analog output signals respectively applied to low-pass filters 44, 46 and 48. The output signal of filter 44 controls the frequency and phase of oscillator 22 so they are ideally equal to the frequency and phase of the suppressed carrier frequency derived from stages 12. The output of filter 46 is supplied to voltage controlled, variable frequency oscillator 50, having an output controlling the phase of clock pulses derived by clock source 51. The clock pulses derived by source 51 are applied in parallel to clock inputs of analog-to-digital converters 28 and 30, to control when the converters take samples of the analog inputs supplied to them. The clock pulses supplied to the clock input of converters 28 and 30 have a frequency approximately equal to twice the frequency of the symbols applied to the converters. The output of low-pass filter 48 is supplied in parallel to gain control inputs of variable gain amplifiers 28 and 25.

While the apparatus of FIG. 1 performs satisfactorily, it is excessively expensive for consumer applications, involving manufacture of perhaps millions of units, and wherein cost savings of even a few cents per unit can be critical. A primary expense associated with the apparatus illustrated in FIG. 1 is the requirement for two samples of each symbol to be taken by analog to digital converters 28 and 30. The cost of the analog-to-digital converters and the digital processing circuits they drive increases appreciably as the frequency of operation thereof increases. The need for three digital-to-analog converters and the low-pass filters associated therewith also adds appreciably to the cost of the apparatus illustrated in FIG. 1. Converter 46, in particular, must derive an output signal having at least eight bits for proper control of variable gain amplifiers 23 and 25.

It is, accordingly, an object of the present invention to provide a new and improved, relatively inexpensive receiver and demodulator for digitally processing signals modulated by symbols.

Another object of the invention is to provide a new and improved receiver and demodulator for digitally processing signals modulated by symbols wherein only a single sample of an analog signal is taken of each symbol.

An additional object of the invention is to provide a new and improved receiver and demodulator for digitally processing signals modulated by symbols including only digital processing for control of carrier and symbol tracking.

A further object of the invention is to provide a new and improved receiver for digitally processing signals modulated by symbols, wherein the receiver employs a nominally fixed frequency local source digital circuitry responsive to an analog-to-digital converter output corrects for frequency and phase errors between the actual frequency derived by the source and a carrier for the modulated signal.

An additional object of the invention is to provide a new and improved receiver and demodulator for digitally processing signals modulated by symbols, wherein the receiver employs digital processing circuitry and a relatively inexpensive digital-to-analog converter is employed for controlling the amplitude of baseband analog signals applied to analog-to-digital converter circuitry.

The Invention

In accordance with one aspect of the invention, a demodulator responsive to symbols in an analog baseband signal comprises relatively inexpensive analog-to-digital converter means responsive to the signal for sampling the signal only once per symbol. To minimize cost, the analog-to-digital converter means is incapable of sampling symbols having a rate two times or higher than the symbol rate. The sampling and symbol rates and the type of analog-to-digital converter means are such that the cost of a comparable analog-to-digital converter means that can sample the signal at twice the symbol rate is at least approximately 30% higher than the cost of the analog-to-digital converter means. The 30% increase in cost is an appreciable factor in consumer applications. In one actual embodiment of the invention, designed to handle 20 megasymbols per second, the cost of an analog-to-digital converter that can sample 20 millions times per second but cannot sample 40 million times per second is 20% of the cost of a comparable analog-to-digital converter that can sample 40 million times per second; comparable converters are converters having the same parameters (e.g., resolution and amplitude input range) other than sampling rate. Hence a savings of 80% in cost of integrated circuit analog-to-digital converters is achieved by sampling only once per symbol relative to the twice per symbol sampling that is typical of the prior art commercial receivers.

While we are aware of prior art converters having a sampling rate of once per symbol, this prior art has drawbacks making it unsuited for consumer uses, such as digital QPSK television reception. Mueller et al., *IEEE Transactions on Communications*, Vol. COM-24, pp. 516–531, May 1976, discloses a digital symbol-rate timing recovery method for pulse amplitude modulated systems wherein it is difficult to derive a timing error estimate. The derived estimate indicates arrival time of each symbol with a large degree of variance. Jennings et al., *IEEE Transactions on Communications*, Vol. COM-33, pp. 729–731, July 1985, discloses a system that provides the timing information for once per symbol sampling by an analog-to-digital converter only after certain data sequences have been received. Neither of these approaches is practical for low cost consumer uses.

In accordance with a further aspect of the invention, a demodulator or receiver responsive to symbols of an analog signal including residual components due to frequency and phase errors between a carrier on which the signal is modulated and a local frequency source comprises means responsive to the analog signal for deriving first I and Q channel digital signals having values determined by sampled amplitudes, including the residual components, of the analog signal. Means responsive to the first I and Q channel digital signals derives second I and Q channel digital signals, corrected for the frequency and phase errors, and a third digital signal having a value representing the frequency and phase errors. The second I and Q channel digital signals are derived by combining the first I and Q channel digital signals and the third digital signal in accordance with a CORDIC function, of the type generally disclosed, e.g., by Volder, *IRE Transactions on Electronic Computers*, pp. 330–334, September 1959.

The straightforward approach for deriving the second I and Q channel digital signals, which has generally been employed in prior art demodulators, is to use a table look-up read only memory (ROM) for deriving signals representing the sine and cosine of an angle indicative of the frequency and phase errors. The values read from the ROM are combined with the values of the first digital signals in accordance with a pair of equations to derive the second I and Q digital signals. The prior art approach, however, requires an excessively large amount of semiconductor structures. The equations are solved with about a 50% savings in the number of gates by utilizing the CORDIC functions rather than the table look-up approach. Preferably the CORDIC function approach and sampling the analog signal amplitude at approximately the symbol rate are combined in a single device to reduce total cost.

The demodulator is preferably included in a receiver having (1) a local frequency source having an output with a nominal frequency susceptible to variation from a set value thereof and (2) means for combining an input signal including symbols modulated on a carrier frequency and the output of the local source. The I and Q channel digital signals have values determined by the modulation and by the frequencies and phases of the carrier and the local source. The values of the second I and Q channel digital signals are compensated by the value of the third digital signal. A variable digital phase shifter has first and second inputs respectively responsive to at least one of the digital signals and clock pulses having approximately an integral multiple (including one) of the symbol rate for controlling sampling times by the analog-to-digital converting means of the signal at approximately the rate so that as the value at the first input of the phase shifter changes the sampling times change. This digital approach to controlling sampling time and compensating for frequency and phase errors, in combination with once per symbol sampling, obviates the need for digital-to-analog converters and extra low pass filters, while permitting inexpensive analog-to-digital converters. Additional cost savings are provided by using the CORDIC function and a relatively inexpensive one-bit sigma-delta modulator for deriving a gain control signal for amplifiers that control the amplitude of the analog signal applied to the analog-to-digital converter means.

In a preferred embodiment, the first input of the digital phase shifter is responsive to a comparison of indications of a function of the values of at least one of the digital signals for differing samples (k) and (k–1) taken by the converter means. The first input is derived as a function of (sign P(k)) P(k–1)+(–sign P(k–1)) P(k), where P(k) is the value of an indication of a sample taken by the converter means for symbol k, and P(k–1) is the value of the indication of the sample taken by the converter means for symbol (k–1). Control for the first input is preferably in response to one or both of the second digital signals.

In accordance with a specific aspect of the invention, a receiver for a modulated input signal having a carrier frequency $\omega_i$ comprises a local oscillator having a frequency $\omega_o$ nominally equal to $\omega_i$. In response to the input signal and the local oscillator there are derived I and Q channel baseband analog signals; the I and Q channel baseband signals include residual components due to frequency and phase errors between the carrier and local oscillator frequencies and phases. First and second analog-to-digital converters respectively sample the I and Q channel baseband analog signals only once per symbol to derive first I and Q channel digital signals having values determined by the values of the sampled I and Q analog signals. Derotation means responds to the first I and Q channel digital signals to derive second I and Q channel digital signals having values corrected for the frequency and phase errors. Control of when the analog-to-digital converter means samples the I and Q channel baseband signals is in response to at least one of the I and Q channel digital signals. Output means responds to the second I and Q channel digital signals to derive intelligence that is similar to intelligence which caused the carrier to be modulated.

Preferably the derotation means includes feedback means responsive to the second I and Q channel digital signals for deriving a further digital signal indicative of the frequency and phase errors. The derotation means is responsive to the first I and Q digital signals and the further signal to control the values of the second I and Q channel digital signals. The further digital signal is derived directly by the feedback means to control derivation of the second I and Q channel digital signals without conversion to an analog signal.

The above and still further objects, features and advantages of the present invention will become apparent upon consideration of the following detailed description of several specific embodiments thereof, especially when taken in conjunction with the accompanying drawings.

DESCRIPTION OF THE PREFERRED EMBODIMENTS

Figure 2:
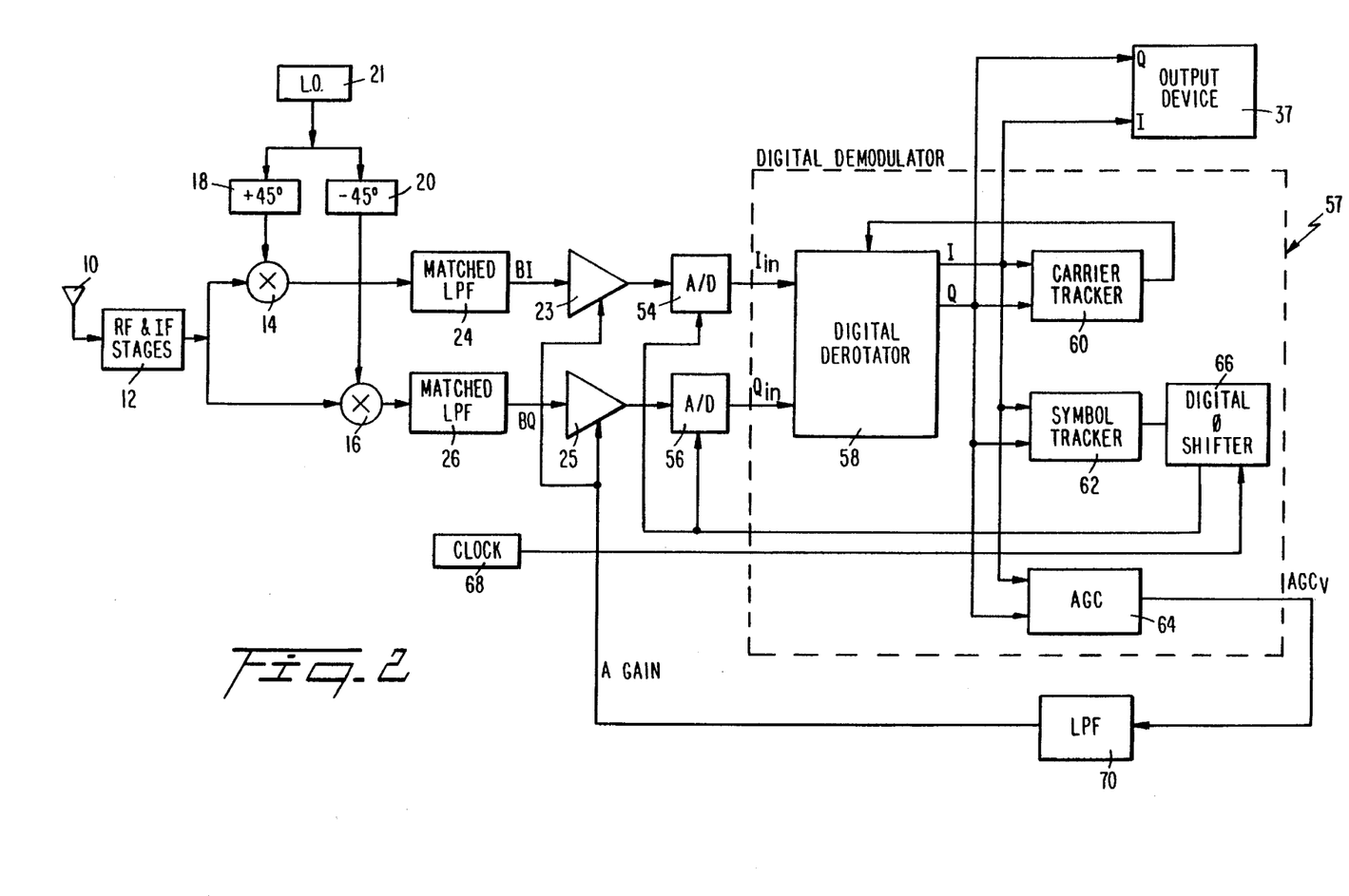
FIG. 2 is a block diagram of a preferred embodiment of a receiver and demodulator employing digital processing circuitry in accordance with the present invention.

Reference is now made to FIG. 2 of the drawing, wherein the front end of a receiver and demodulator in accordance with a preferred embodiment of the present invention is illustrated as being essentially the same as the front end of the prior art receiver illustrated in FIG. 1 and thereby includes antenna 10, RF and IF stages 12, mixers 14 and 16, +45° and −45° phase shifters 18 and 20, matched low pass filters 24 and 26, and variable gain amplifiers 23 and 25. Variable frequency, voltage controlled oscillator 22 is replaced by local oscillator 21 having an output frequency nominally equal to the fixed frequency output of stages 12; oscillator 21 has no control input terminal. Because the receiver and demodulator of FIG. 2 is preferably of a type employed for consumer applications, the frequency of oscillator 21 is not particularly stable, being susceptible to considerable variation during use, as well as being subject to variation from unit to unit due to manufacturing tolerances.

The baseband, analog I and Q channel output signals of matched filters 24 and 26 are applied to analog to digital converters 54 and 56, respectively. Converters 54 and 56 sample the output signals of filters only once during each symbol of I and Q quadrature phase shift key analog signals derived by matched filters 24 and 26. To minimize cost, converters 54 and 56 are incapable of sampling the signals applied by them twice per symbol as is required for converters 28 and 30 of the prior art. Hence, the cost of converters 54 and 56 and the digital circuitry they drive is considerably less than the cost of converters 28 and 30 and the digital circuits they drive. The I and Q baseband signals of FIG. 2 need be sampled by converters 54 and 56 only once per symbol because of the nature of symbol tracking processing employed in FIG. 2, as discussed infra.

In one preferred embodiment for sampling at 20 mHz, each of converters 54 and 56 is SONY type CXD 1172AM; the comparable SONY D1179Q or TRW 1175N2C40 converter, capable of sampling at 40 mHz, costs approximately 400% more than the SONY CXD1172AM. While the present invention is particularly adapted to handle 15–35 megasymbols per second, many of the principles are applicable to other symbol rate ranges.

Converters 54 and 56 derive digital signals having values representing the polarity and magnitude of the analog input signals sampled by them. In the preferred embodiment, each of converters 54 and 56 derives a six-bit signal for each sample. For lower resolution, each of converters 54 and 56 can produce a four-bit signal in response to each sample.

The $I_{in}$ and $Q_{in}$ channel digital output signals of converters 54 and 56 have amplitudes that are determined by (a) the QPSK modulation on the suppressed carrier supplied to mixers 14 and 16, (b) error components due to differences in the frequency and phase of the output of local oscillator 21 relative to the frequency and phase of the suppressed carrier supplied to mixers 14 and 16 by stages 12, and (c) error components due to differences in the symbol rate and the sampling rate of converters 54 and 56. The $I_{in}$ and $Q_{in}$ signals are supplied to custom large scale integrated digital processing circuit 57 included on a single integrated circuit chip. Circuit 57 includes derotator circuit 58, which responds to $I_{in}$ and $Q_{in}$, as well as a digital signal, $\phi$, representing the error components of the frequency and phase differences. Digital derotator 58 responds to the input signals thereof to derive digital output signals I and Q in accordance with:

$$I = I_{in}\cos\phi - Q_{in}\sin\phi \quad (1)$$

$$Q = Q_{in}\cos\phi + I_{in}\sin\phi \quad (2)$$

The I and Q digital output signals of derotator 58 are corrected for the frequency and phase offset between the output frequency ($\omega_0$) of local oscillator 21 and the suppressed carrier output frequency ($\omega_0$) of amplifier 12. The values of I and Q are computed in accordance with a CORDIC function, described infra, causing a substantial reduction in cost over the prior art look-up table or Taylor series approaches because there is about a 50% reduction in the number of gates in the CORDIC implementation relative to these implementations.

The I and Q output signals of derotator 58 are applied in parallel to output device 37, carrier tracker 60, symbol tracker 62 and automatic gain controller 64; the latter three are included on the single integrated circuit chip containing processing circuit 57. Carrier tracker 60 derives a digital output signal having polarity and magnitude bits representing $\phi$, the difference between the frequencies and phases of local oscillator 21 and the suppressed carrier of stages 12; the digital signal is applied as the phase input signal to digital derotator 58 without conversion to an analog signal, which helps to reduce cost.

The digital output signal of symbol tracker 62, having a polarity and magnitude representing the time shift necessary for correct sampling of each symbol applied to analog-to-digital converters 54 and 56, is a control input of digital asynchronous phase shifter 66, included in digital processing circuit 57 on the single integrated circuit chip. Phase shifter 66 is preferably of a type described in the co-pending, commonly assigned application entitled "Asynchronous Digital Phase Shifter," filed Dec. 23, 1992, by Goldenberg et al. Ser. No. 07/994,831. Phase shifter 66 is also responsive to clock source 68, having a frequency slightly greater than the frequency of symbols of the baseband I and Q channel signals supplied to analog-to-digital converters 54 and 56; alternatively, in certain situations where certain operations are performed at a frequency that is approximately an integral multiple, greater than one, of the symbol frequency, clock 68 has a frequency that is approximately the symbol frequency times the multiple and phase shifter 66 includes a frequency divider having a division factor equal to the multiple for deriving the sampling pulses applied to the converters. Phase shifter 66 responds to the output of symbol tracker 62, to control when pulses from clock source 68 are applied to clock or sample control inputs of analog-to-digital converters 54 and 56 once per symbol.

Automatic gain controller 64 responds to the I and Q outputs of derotator 58 to derive a signal for controlling the gains of amplifiers 23 and 25. Controller 64 includes a relatively inexpensive one bit sigma-delta modulator, preferably of a type described by Agrawal et al. in an article entitled "Design Methodology for $\Sigma\Delta M$," *IEEE Transactions on Communications*, Vol. No. 3, March, 1983, pages 360–369, to obviate the requirement for an eight-to-ten bit digital signal that must be applied to conventional digital-to-analog converter 42 of FIG. 1. The resulting variable frequency constant amplitude and duration output pulses of the modulator in controller 64 are applied to low-pass filter 70, having an analog output which is supplied to gain control inputs of amplifiers 23 and 25.

Figure 3:
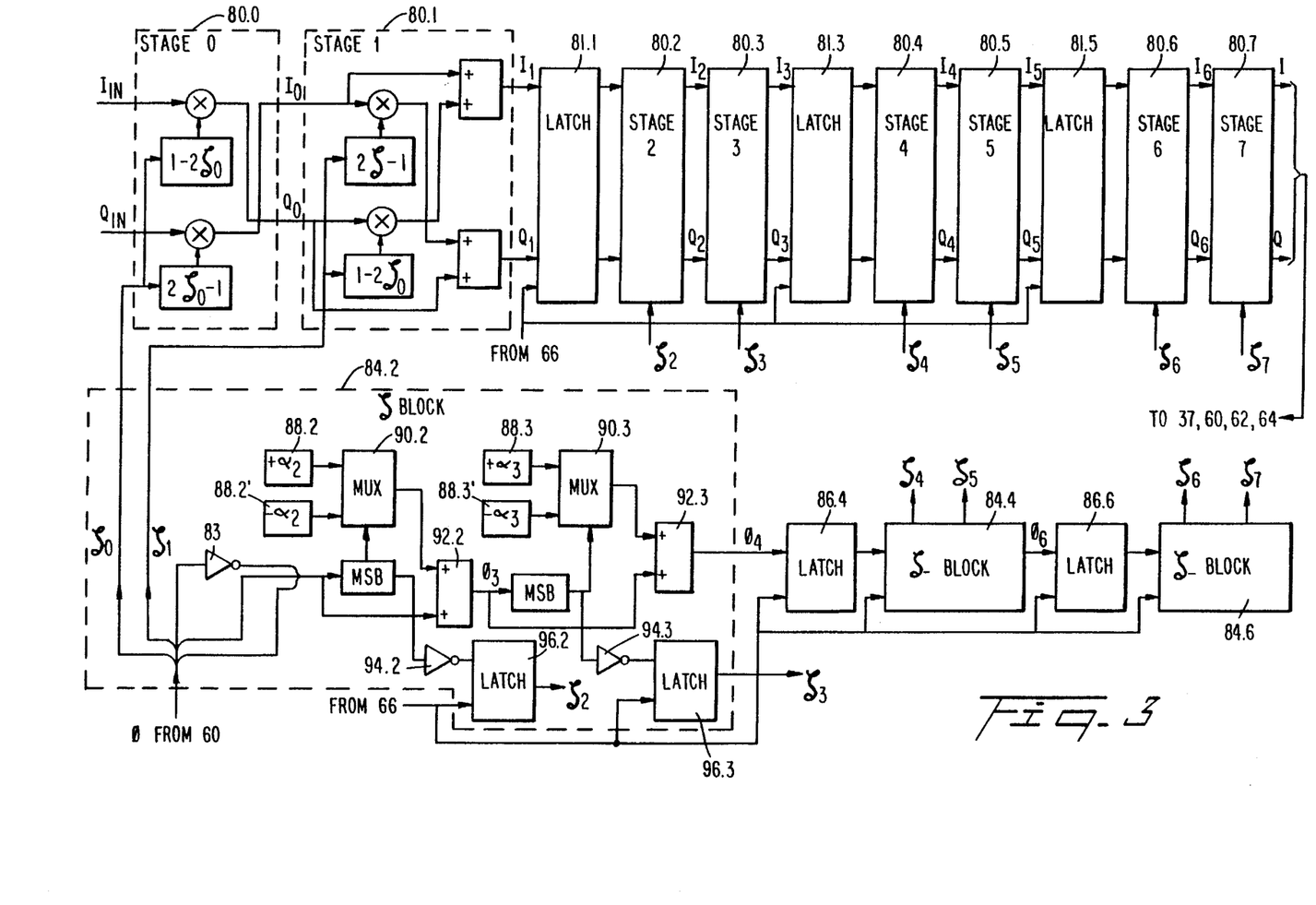
FIG. 3 is a block diagram of a derotator employed in FIG. 2.

Reference is now made to FIG. 3 of the drawing, a conceptual block diagram of derotator 58 for computing the values of I and Q in accordance with Equations (1) and (2) in response to $I_{in}$, $Q_{in}$ and $\phi$. The straightforward approach to calculate the values of I and Q is to use table lookups or sine and cosine multipliers for the values of $\sin \phi$ and $\cos \phi$ in Equations 1 and 2. However, these straightforward approaches use an excessive amount of integrated circuit elements. By using the so-called CORDIC function approach, as disclosed by Volder, the number of integrated circuit elements is reduced by a factor of approximately 50%, to provide a considerable cost savings.

The CORDIC computer of FIG. 3 includes M+1 cascaded stages 80.0, 80.1, 80.2 ... 80.k ... 80.(M) (where M is an odd integer), such that stage 80.0 is responsive to the $I_{in}$ and $Q_{in}$ outputs of analog-to-digital converters 54 and 56, and succeeding stages 80.k are responsive to output signals $I_{(k-1)}$ and $Q_{(k-1)}$ of stage 80.(k-1). Latches 81.1, ... 81.p ... 81.(M-2) (where p and M are odd integers and there is an even number of stages 80 in the circuit of FIG. 3), connected between the outputs of the odd-numbered stages and the adjacent next higher-numbered even stage, are activated at the same frequency as the sampling frequency for converters 54 and 56. In addition, stages 80.0 ... 80.k ... 80.M are respectively responsive to values of $\zeta_O \ldots \zeta_k \ldots \zeta_M$, as derived by $\zeta$ calculator 82, which responds to the $\phi$ output signal of carrier tracker 60 (which is in two's complement notation) and the sampling pulses supplied by phase shifter 62 to converters 54 and 56. $\zeta$ calculator 82 responds to the value of $\phi$ to derive, for each of stages 80.0, 80.1, 80.2 ... 80.k ... 80.M a one bit $\zeta$ value, which is either a 0 or 1.

In steady state, the values of $\zeta$ are calculated once for each symbol time of the analog signal supplied to converters 54 and 56. For each set of $I_{in}$ and $Q_{in}$ stage 80.M derives a set of I and Q values which are the outputs of derotator 58. The value of $\zeta$ is the most significant bit of $\phi$, as derived from carrier tracker 60; the value of $\zeta_1$ associated with stage 80.1 is the second most significant bit of $\phi$; Associated with each of $\zeta_2$–$\zeta_M$ are values of $\phi_2$–$\phi_M$. The value of $\phi_2$ equals the value of $\phi$, with the two most significant bits truncated and the third most significant bit reversed in digital value. Each $\zeta$ value for stages 80.2–80.M is associated with a predetermined angle, $\alpha_j$, such that the value of $\alpha_2$ for stage 80.2 is 26.5°, the value of $\alpha_3$ for stage 80.3 is 14.04°, etc., such that $\alpha_j$=arc tan $(\frac{1}{2}^{j-1})$, j is selectively each of integers 2 ... k ... M. In one preferred embodiment, M=7, so there are eight stages 80, i.e., 80.0–80.7.

The inputs of stages 80.2–80.M are combined after selective bit shifting and polarity reversal as a function of $\zeta$ so that, $$I_k = I_{k-1} + (1-2\zeta_k)Q_{k-1}2^{-(k-1)} \tag{3}$$

and $$Q_k = Q_{k-1} + (2\zeta_k-1)I_{k-1}2^{-(k-1)} \tag{4}$$

Stage 80.0 responds to $I_{in}$ and $Q_{in}$ to derive $I_0$ and $Q_0$ in accordance with $$I_0 = (1-2\zeta_0)Q_{in} \text{ and} \tag{5}$$

$$Q_0 = (2\zeta-1)I_{in} \tag{6}$$

while stage 80.1 derives $I_1$ and $Q_1$ in accordance with $$I_1 = I_0 + (1-2\zeta_1)Q_0 \text{ and} \tag{7}$$

$$Q_1 = Q_0 + (2\zeta_1-1)I_0. \tag{8}$$

Since $(1-2\zeta_j)$ and $(2\zeta_j-1)$ can have values of only +1 and −1, the multiplications by $(1-2\zeta_j)$ and $(2\zeta_j-1)$ basically involve selective reversal or non-reversal of the most significant, polarity indicating bits of the $Q_{k-1}$ and $I_{k-1}$ inputs of a particular stage; these operations are easily performed with half adders. Multiplication by $2^{-(k-1)}$ is also easily performed by shifting the bits to the right (k−1) stages in a shift register.

Zeta ($\zeta$) calculator 82 responds to the value of $\phi$, as derived from carrier tracker 60, to derive the one bit values of $\zeta_0, \zeta_1 \ldots \zeta_k \ldots \zeta_m$. For the specific configuration illustrated in FIG. 3, the most significant and second most significant bits of $\phi$, as derived from carrier tracker 60, are respectively supplied to the $\zeta$ inputs of stages 80.0 and 80.1 as signals $\zeta_0$ and $\zeta_1$. The third most significant bit (with a polarity reversal by inverter 83) in the value of $\phi$ and the remaining bits in the value of $\phi$, as derived from carrier tracker 60, are supplied to $\zeta$ block 84.2, which derives $\zeta$ inputs $\zeta_2$ and $\zeta_3$ for stages 80.2 and 80.3, as well as a multi-bit signal $\phi_4$, having a value determined by the $\phi_2$ input of block 84.2 and the values of $\alpha_2$ and $\alpha_3$ stored in block 84.2.

The $\phi_4$ output of $\zeta$ block 84.2 is supplied to latch 86.4, which is activated by the output of phase shifter 66 simultaneously with latches 81.1–81.(M–2). Latch 86.4 supplies $\zeta$ block 84.6 with a latched replica of the $\phi_4$ output of block 84.2. $\zeta$ block 84.4 responds to the output of latch 86.4 and the values of $\alpha_4$ and $\alpha_5$ stored therein to derive one-bit signals $\zeta_4$ and $\zeta_5$, respectively supplied to $\zeta$ inputs of stages 80.4 and 80.5. In addition, $\zeta$ block 84.4 derives a multi-bit signal $\phi_6$, determined by the output of latch 86.4 and the values of $\alpha_4$ and $\alpha_5$ stored in the $\zeta$ block. The $\phi_6$ multi-bit output of $\zeta$ block 84.6 is supplied to latch 86.6, which responds to pulses from phase shifter 66 to supply a latched replica of the $\phi_6$ output of $\zeta$ block 84.4 to $\zeta$ block 84.6. $\zeta$ block 84.6 responds to the output of latch 86.6 and values of $\alpha_6$ and $\alpha_7$ stored therein to derive one-bit $\zeta_6$ and $\zeta_7$ signals which are supplied to the $\zeta$ inputs of stages 80.6 and 80.7.

All of $\zeta$ blocks 84.2, 84.4 and 84.6 are identical in configuration except for the values of $\alpha$ stored therein. Therefore, a description of $\zeta$ block 84.2 suffices for the description of f blocks 84.4 and 84.6. As illustrated in FIG. 3, $\zeta$ block 84.2 responds to the value of $\phi_2$ to derive the $\phi_4$, $\zeta_2$ and $\zeta_3$ signals. $\zeta$ block 84.2 includes pre-wired multi-bit digital registers 88.2 and 88.3 that respectively store digital values representing $\alpha_2$ (26.5°) and $\alpha_3$ (14.04°). The most significant polarity indicating bits of the signals stored in registers 88.2 and 88.3 are reversed in polarity to derive digital values respectively representing $-\alpha_2$ and $-\alpha_3$; the values of $-\alpha_2$ and $-\alpha_3$ are stored in pre-wired registers 88.2' and 88.3', respectively. The digital levels stored in registers 88.2 and 88.2' are supplied to signal inputs of multiplexer 90.2, while the signals stored in registers 88.3 and 88.3' are supplied to the signal inputs of multiplexer 90.3. Multiplexer 90.2 includes a control input terminal responsive to the most significant bit in $\phi_2$, so that as the binary value of the most significant bit of $\phi_2$ changes, the values of $\alpha_2$ and $-\alpha_2$ as supplied to the inputs of the multiplexer by registers 88.2 and 88.2' are selectively supplied to the multi-bit output of multiplexer 90.2. The multi-bit output of multiplexer 90.2 and the multi-bit value of $\phi_2$ supplied to $\zeta$ calculator 84.2 are combined in digital adder 92.2, which derives a $\phi_3$ multi-bit output equal to the sum of $\phi_2$ and the output of multiplexer 90.2. The most significant bit in the $\phi_3$ output of adder 92.2 is coupled to the control input of multiplexer 88.3, to control coupling of one of the $\alpha_3$ and $-_3$ inputs of the multiplexer to the multiplexer output. The multi-bit outputs of multiplexer 90.3 and adder 92.2 are added together in digital adder 92.3, which derives a $\phi_4$ multi-bit output that is supplied to the input of $\zeta$ block 84.4.

The most significant bits in $\phi_2$ and $\phi_3$, as supplied to the control inputs of multiplexers 90.2 and 90.3, are respectively reversed in binary level by inverters 94.2 and 94.3. Inverters 94.2 and 94.3 thus derive one bit outputs which are the two's complement of the most significant bits of $\phi_2$ and $\phi_3$ to provide signals having values equal to $\zeta_2$ and $\zeta_3$. The outputs of inverters 94.2 and 94.3 must be maintained constant for one symbol time, a result achieved by supplying the outputs of inverters 94.2 and 94.3 to latches 96.2 and 96.3, activated by the same sampling pulses which are applied by phase shifter 66 to converters 54 and 56. Thereby, latches 96.2 and 96.3 derive constant binary values indicative of $\zeta_2$ and $\zeta_3$ for the interval of each sample taken by converters 54 and 56. The outputs of latches 96.2 and 96.3 are respectively supplied to the $\zeta$ inputs of stages 80.2 and 80.3. Blocks 84.4 and 84.6 are similarly constructed to supply $\zeta_4$–$\zeta_7$ inputs to the $\zeta$ inputs of stages 80.4–80.7, respectively.

To solve Equations (5) and (6), stage 80.0 includes multipliers 110 and 112, respectively responsive to the $I_{in}$ and $Q_{in}$ signals derived from converters 54 and 56. Multipliers 110 and 112 are also respectively responsive to the values of $(1-2\zeta_0)$ and $(2\zeta_0-1)$, having ±1 values respectively derived by circuits 114 and 116, both of which are responsive to the value of $\zeta_0$. In actuality, multiplier 110 and circuit 114 perform modulo 2 addition, with a binary half adder, on the one bit values of $\zeta_0$ and the most significant, polarity indicating bit of $I_{in}$. (Numerous other multiplications and operations involving $(1-2\zeta_k)$ and $(2\zeta_k-1)$ are performed by stages 80.0–80.M in a similar manner.) The outputs of multipliers 110 and 112 are respectively supplied to $I_O$ and $Q_O$ outputs of stage 80.0.

To solve Equations (7) and (8), stage 80.1 includes multipliers 118 and 120, respectively responsive to the $I_0$ and $Q_0$ outputs of stage 80.0 that are applied to inputs of stage 80.1. Multipliers 118 and 120 are also responsive to ±1 values computed in accordance with $(2\zeta_1-1)$ and $(1-2\zeta_1)$ by circuits 122 and 124, both of which are responsive to the value of $\zeta_1$. The resulting product outputs of multipliers 118 and 120 are respectively supplied to one input of adders 126 and 128. The other inputs of adders 126 and 128 are respectively responsive to the $Q_0$ and $I_0$ signals supplied to stage 80.1. Adders 126 and 128 respectively derive output signals representing $Q_1$ and $I_1$.

Figure 3A:
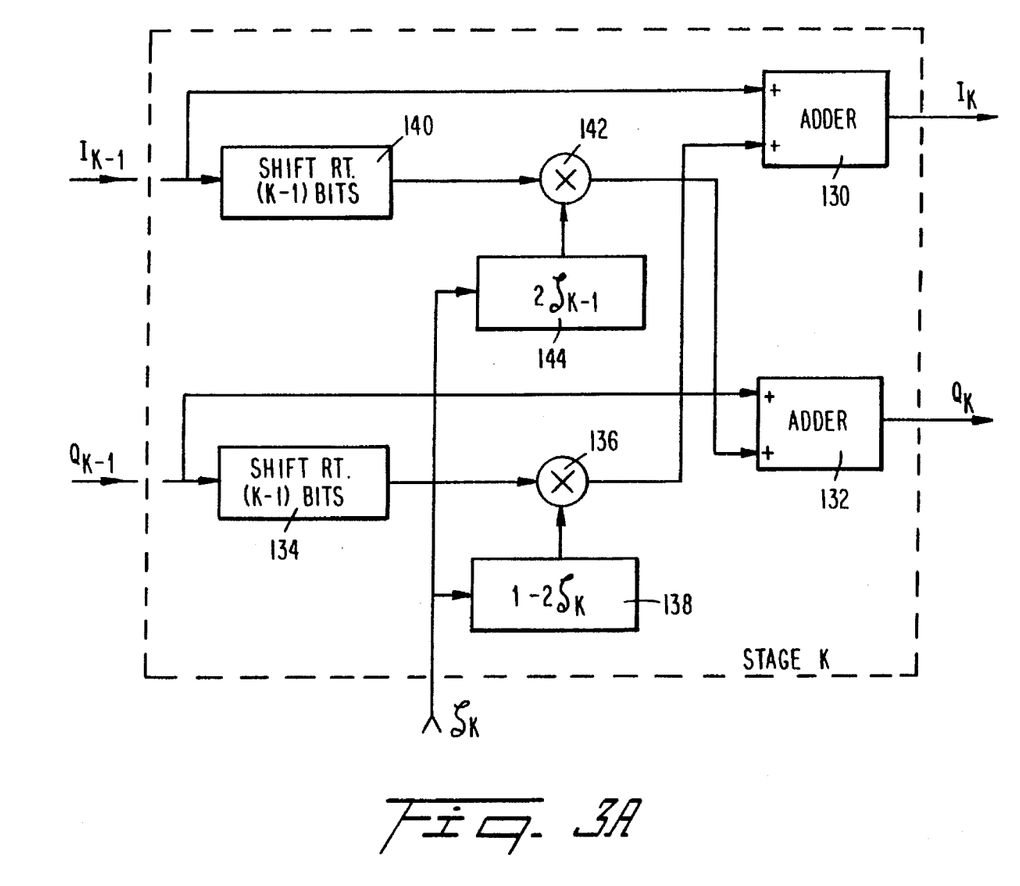
FIG. 3A is a block diagram of one stage of the derotator of FIG. 3.

The remaining stages 80.2 . . . 80.k . . . 80.M are very similar to each other, and generally take the form indicated by the circuit diagram of FIG. 3A for stage 80.k, which is used to solve Equations (3) and (4). Stage 80.k responds to $I_{k-1}$ and $Q_{k-1}$ output signals of stage 80.(k-1). The $I_{k-1}$ and $Q_{k-1}$ input signals of stage 80.k are respectively supplied to one input of adders 130 and 132. The other input of adder 130 is derived by shifting the $Q_{k-1}$ input of stage 80.k to the right by (k-1) bits in shift register 134, having an output that is supplied to one input of multiplier 136. The remaining input of multiplier 136 is $(1-2\zeta_k)$, as derived by circuit 138 in response to the $\zeta_k$ input signal supplied to it. The output of multiplier 136 is supplied to the other input of adder 130.

The remaining input of adder 132 is derived by supplying the $I_{k-1}$ input of stage 80.k to shift register 140, which shifts the $I_{k-1}$ signal to the right by (k-1) bits. The output of shift register 140 is multiplied in multiplier 142 by $(2\zeta_k-1)$, a signal that is derived by circuit 144 in response to the value of $\zeta_k$. The output of multiplier 142 is supplied to the remaining output of adder 132. Adders 130 and 132 respectively derive output signals indicative of $I_k$ and $Q_k$.

While the apparatus of FIG. 3 is illustrated as including (M+1) separate stages 80.0–80.M, it is to be understood that in the preferred embodiment it is not necessary to use (M+1) stages. Instead, a plurality of such stages are employed in the preferred embodiment and output signals from the "last" stage are recirculated back to a previous stage, to minimize hardware requirements.

Figure 4:
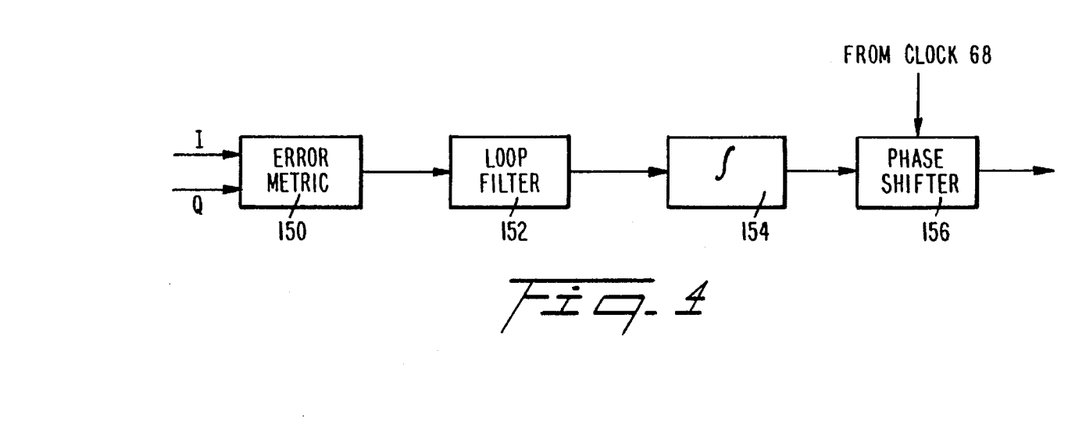
FIG. 4 is a block diagram of a symbol tracker employed in FIG. 2.

FIG. 4 is a block diagram of symbol tracker 62, which responds to one or both of the I and Q output signals of derotator 58 to derive a control signal for digital phase shifter 66, also responsive to clock 68. Phase shifter 66 controls when sampling pulses are supplied to analog-to-digital converters 54 and 56. In the preferred embodiment, the I and Q output signals of derotator 58 are supplied to error metric computer 150 which basically compares the amplitudes of adjacent samples taken by analog-to-digital converters 54 and 56 of the analog I and Q baseband signals. From the adjacent sampled values, a determination is made of the approximate deviation of the adjacent symbols from a zero crossing line. Ideally, each sampling pulse supplied to converters 54 and 56 occurs in the center of each symbol supplied to the converters. Symbol timing error is calculated in accordance with:

$$(\text{sign } I(k))I(k-1)+(-\text{sign } I(k-1))I(k)+$$

$$(\text{sign } Q(k))Q(k-1)+(-\text{sign } Q(k-1))Q(k) \quad (9)$$

where I(k) is the value of an indication of I for symbol k
I(k−1) is the value of the indication of I for symbol (k−1)
Q(k) is the value of the indication of Q for symbol k, and
Q(k−1) is the value of the indication of Q for symbol (k−1).

The symbol timing error signal for a pair of adjacent bits, as derived from error metric calculator 150, is supplied to digital loop filter 152, basically a low pass filter having a cutoff frequency that is a fraction of a percent of the frequency of clock 68. The output of loop filter 152 is supplied to integrator 154 which accumulates the filtered symbol timing error values to derive a signal representing the actual value of a phase shift to be imposed on pulses from clock 68, so sampling pulses are supplied once per symbol to analog-to-digital converters 54 and 56 at approximately the center of each symbol. The digital output signal of integrator 154 is supplied to digital phase shifter 156, preferably of a type disclosed in the copending, commonly assigned application of Goldenberg et al., Ser. No. 07/994,851. Pulses from clock 68 supplied to phase shifter 156 have a frequency slightly above the frequency of the symbols supplied to converters 54 and 56. Basically, phase shifter 156 responds to the digital control signal supplied thereto by integrator 154 to delay selected pulses from clock 68, to provide sampling pulses to analog-to-digital converters 54 and 56 with the required timing.

Figure 5:
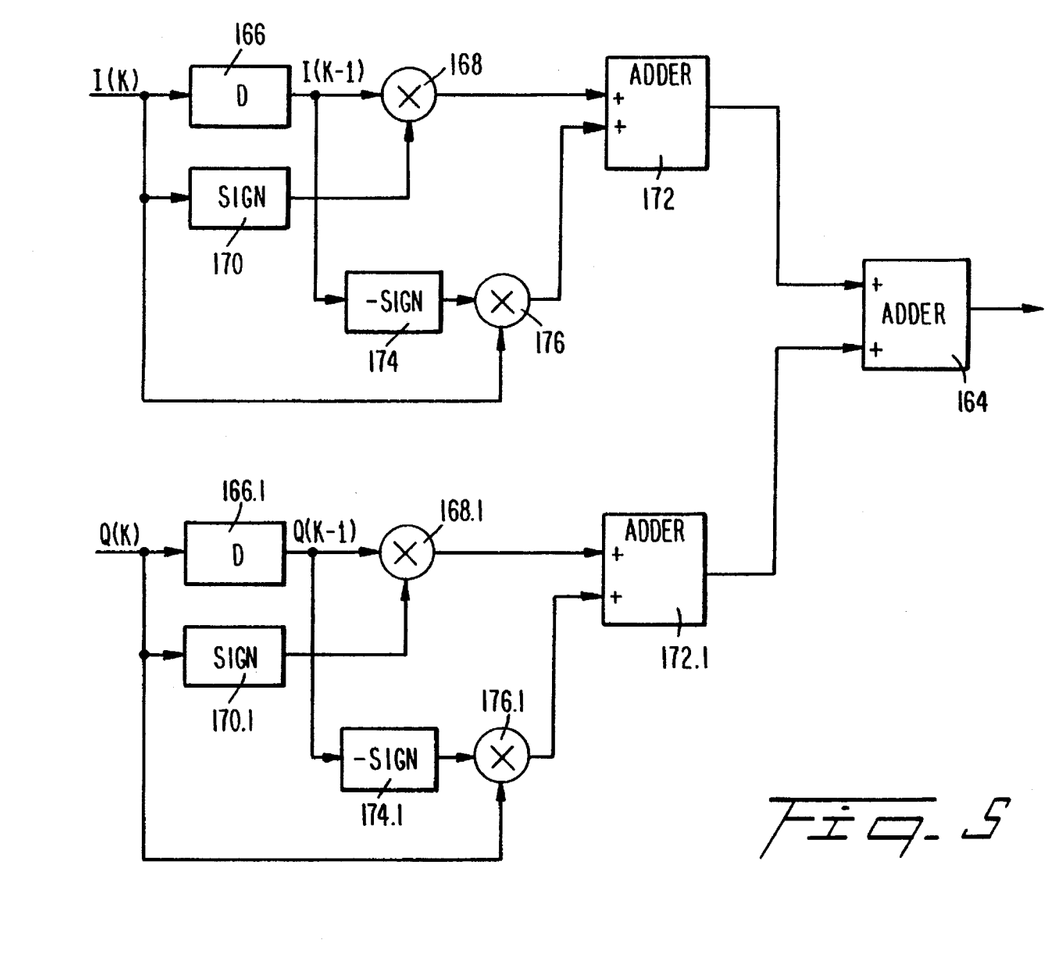
FIG. 5 is a block diagram of an error metric calculator of FIG. 4.

A preferred configuration for symbol timing error metric calculator 150 is illustrated in FIG. 5 as including I and Q symbol timing error calculating channels 160 and 162. The symbol timing error calculations made by channels 160 and 162 are combined in adder 164 to derive a composite symbol timing error output signal. Since I and Q channels 160 and 162 are identical, a description of only the I calculating channel is provided. Corresponding elements of the Q channel are indicated on FIG. 5 with the same reference numerals as the reference numerals for the I channel, except that each reference numeral in the Q channel is followed by the designation ".1".

I calculating channel 160 responds to the I output of derotator calculator 58 for sample k taken by analog-to-digital converter 54; this input to channel 160 is designated as I(k). The I(k) input to channel 160 is delayed by the time between adjacent symbols of the baseband signal supplied to converter by delay unit 166. Delay unit 166 thereby derives an output signal I(k−1), having a value that is a function of the sample taken by analog-to-digital converter of symbol (k−1). The I(k−1) output of delay unit 166 is supplied to one input of multiplier 168, having a second input equal to the sign of I(k), i.e., the value of the polarity indicating most significant bit of I(k), as derived from sign detector 170. The output of multiplier 168 is supplied to one input of adder 172 in accordance with sign (I(k)) I(k−1).

The other input to adder 172 is a digital signal equal to −sign (I(k−1)) I(k). To these ends, the most significant bit of the I(k−1) output of delay unit 166 is inverted in binary value by −sign element 174; the inverted output of the −sign element 174 is applied to one input of multiplier 176 having a second input equal to I(k). The resulting product output of multiplier 176 is applied to the second input of adder 172 which thereby derives an output signal in accordance with:

$$\text{sign } I(k)I(k-1)+(-\text{sign } I(k-1))I(k) \quad (10).$$

Q channel 162 responds to digital signal Q(k) and derives a similar output in accordance with:

$$\text{sign } Q(k)Q(k-1)+(-\text{sign } Q(k-1))Q(k) \quad (11).$$

The resulting outputs of I and Q channels 160 and 162 are combined in adder 164 which derives an output signal representing the symbol timing error for a pair of adjacent symbols in accordance with Equation (9), supra.

It is not necessary in all instances to employ the I and Q channels. Only one of the channels can be used in certain situations to derive the symbol error correction signal. While it is preferable for the outputs of derotator 58 to be applied to symbol tracker 62, the outputs of converters 54 and 56 can be applied directly to the symbol tracker with decreased resolution in the signal derived from output device 37.

Figure 6:
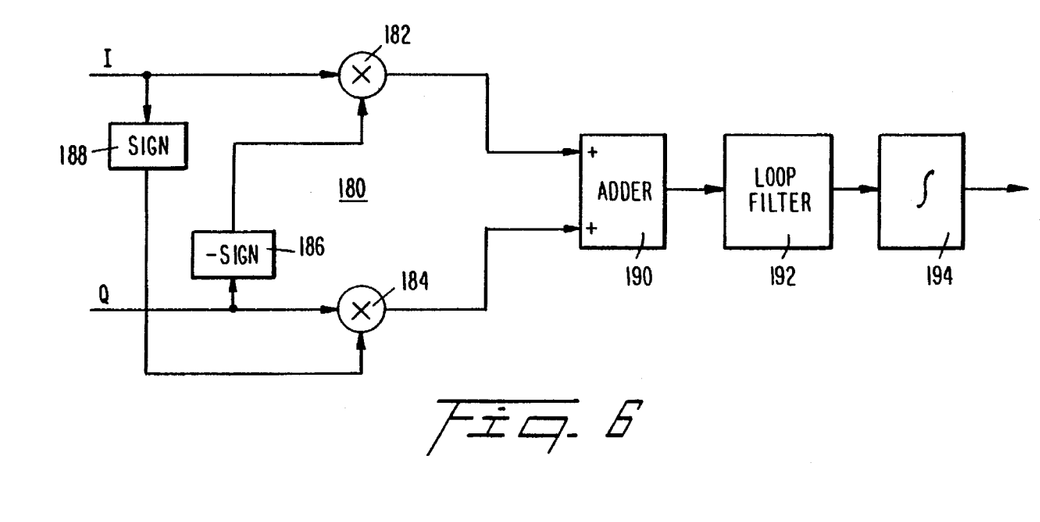
FIG. 6 is a block diagram of a carrier tracker employed in FIG. 2.

Reference is now made to FIG. 6 of the drawing, a block diagram of carrier tracker 60 responsive to the I and Q outputs of derotator 58 employed for deriving a signal indicative of the frequency and phase errors between the frequency and phase of local oscillator 21 and the frequency and phase of the suppressed carrier of the RF signal supplied to mixers 14 and 16. The circuit of FIG. 6 includes error metric calculator 180 which basically compares the amplitudes of the I and Q outputs of the derotator 58 to derive a signal in accordance with:

$$(-\text{sign } Q)(I)+(\text{sign } I)Q (12).$$

Phase error metric calculator 180 includes multipliers 182 and 184, having first inputs respectively responsive to the I and Q outputs of derotator 58. A second input of multiplier 182 is responsive to −sign Q (as derived from sign detector 186), while a second input of multiplier 184 is equal to sign I, as derived from sign detector 188. The outputs of multipliers 182 and 184 are combined in digital adder 190, which derives an output signal in accordance with Equation (12), supra. The output of adder 190 thus represents the total phase error between the output of local oscillator 21 and the carrier frequency supplied to mixers 14 and 16.

The output signal of phase error metric calculator 180 is supplied to low pass loop filter 192, having a cutoff frequency that is between a fraction of a percent and a few percent of the frequency of clock 68. The output of loop filter 192 is accumulated in integrator 194, having an output signal representing the phase correction φ to be applied to derotator 58.

Figure 7:
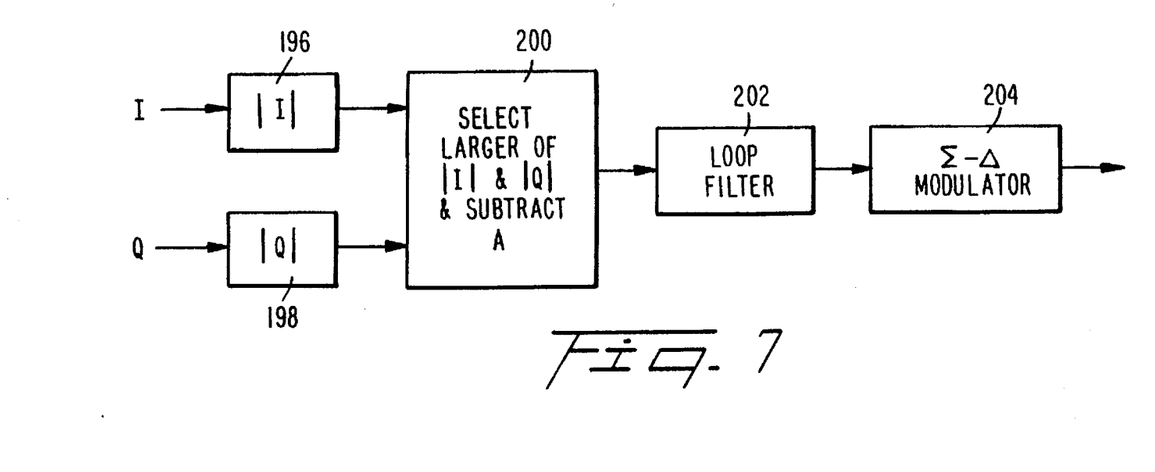
FIG. 7 is a block diagram of an amplitude tracker employed in FIG. 2.

Reference is now made to FIG. 7 of the drawing, a block diagram of automatic gain controller 68 for variable gain amplifiers 23 and 25, causing the amplitudes of the baseband AC signal supplied to digital-to-analog converters 54 and 58 to be controlled. Basically, the circuit of FIG. 7 determines the magnitude of the I or Q signal having the largest value, compares it with a reference value and supplies a smoothed resulting error signal to a one bit Σ–Δ modulator, of the aforementioned type disclosed by Agrawal. The Σ–Δ modulator derives a series of fixed duration, variable frequency pulses that are averages by a low-pass filter to provide an analog output signal that is supplied as a gain control signal to amplifiers 23 and 25. The use of a one bit Σ–Δ modulator for digital-to-analog converter purposes is highly advantageous because of the relatively low cost thereof to achieve approximately the same resolution as is attained by 8–10 bit digital-to-analog converter 42.

To these ends, the I and Q signals derived by derotator 58 or the $I_{in}$ and $Q_{in}$ output of converters 54 and 56 are supplied to absolute value circuits 196 and 198, respectively; in the illustrated embodiment the derotator outputs are supplied to the absolute value circuits. Absolute value circuits 196 and 198 remove the polarity indicating most significant bits from the I and Q signals, which are then supplied to comparator 200. Comparator 200 selects the I or Q signal having the largest magnitude and subtracts it from a reference value associated with maximum magnitude (A) of the analog inputs of analog to digital converters 54 and 56. The resulting digital error signal is supplied to low-pass loop filter 202 having a cutoff frequency that is a few percent of the frequency of clock 68. The output of loop filter 202 is supplied to one bit Σ–Δ modulator 204, included on the same integrated circuit chip as circuits 58, 60 and 62. Σ–Δ modulator 204 derives a series of variable frequency constant amplitude pulses which are averaged by low-pass filter 70 into a variable amplitude analog signal that is supplied as gain control signals for variable gain amplifiers 23 and 25.

Figure 8:
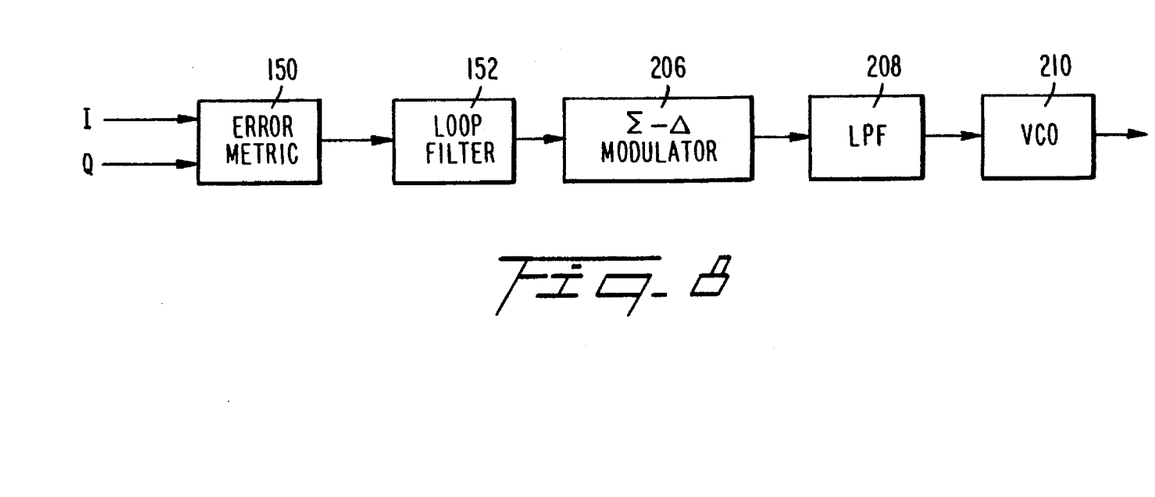
FIG. 8 is a block diagram of an alternate symbol tracker employed in FIG. 2.

An alternate embodiment for controlling when timing pulses are supplied to analog-to-digital converters 54 and 56 is illustrated in FIG. 8. FIG. 8 is similar to FIG. 4, in that both include symbol error metric calculator 150, FIG. 5, which drives loop filter 152. However, the circuit of FIG. 8 does not include clock source 68 and digitally controlled phase shifter 66. Instead, the output of filter 152 is supplied to one bit Σ–Δ modulator 206, included on the same integrated circuit chip as circuits 58, 60 and 62. Modulator 206 derives a series of variable frequency constant amplitude pulses that are supplied to low-pass filter 208, having an analog output applied to a frequency control input of voltage controlled oscillator 210. Voltage controlled oscillator 210 derives an output having a frequency equal approximately to the frequency of the symbols applied to analog-to-digital converters 54 and 56. The output of oscillator 210 is applied to the clock input of converters 54 and 56 causing the converters to sample the symbols of the baseband analog signals applied to them once per symbol, preferably in the center of each symbol.

While there have been described and illustrated plural specific embodiments of the invention, it will be clear that variations in the details of the embodiments specifically illustrated and described may be made without departing from the true spirit and scope of the invention as defined in the appended claims.

What is claimed:

1. A demodulator responsive to symbols having a symbol rate in an analog baseband signal comprising analog-to-digital converter means responsive to the signal for sampling the signal only once per symbol to derive a digital output, and digital signal processing circuitry responsive to the digital output of the converter means, the baseband signal including residual components due to frequency and phase errors between a carrier on which the baseband signal is modulated and a local frequency source, the digital processing circuitry responding to the converter means to derive a further signal having a value corrected for the frequency and phase error, the digital processing circuitry including a feedback loop responsive to the further signal for deriving an additional signal having a value determined by the frequency and phase error, the additional signal controlling the value of the further signal, the digital processing circuitry comparing indications of a function of the values of the digital output derived by the converter means for consecutive symbols to derive a digital signal having a value indicative of a change to be made in the relative timing of when the symbols are to be sampled by the converter means, and a digitally-controlled variable phase shifter responsive to the digital change indicating signal and clock pulses having a frequency approximately equal to an integral multiple the rate for controlling when the converter samples the symbols.

2. The demodulator of claim 1 wherein the demodulator is included in a receiver responsive to a carrier modulated by the analog baseband signals, the receiver including means responsive to the carrier for deriving the signal.

3. The demodulator of claim 1 wherein the symbol and sampling rates are approximately 15–35 million times per second.

4. The demodulator of claim 1 wherein the digital processing circuitry responds to the digital output of the converter means for controlling the relative timing of when the signal is to be sampled by the converter means.

5. The demodulator of claim 1 wherein the converter means includes at least one analog-to-digital converter integrated circuit on a chip, the cost of the analog-to-digital integrated circuit chip being no more than approximately 70% of the cost of an analog-to-digital integrated circuit chip for the comparable analog-to-digital converter means.

6. The demodulator of claim 1 wherein the control for the relative timing of sampling of the symbols by the converter means is in response to the further signal.

7. The demodulator of claim 1 wherein the analog-to-digital converter means derives the digital output as first I and Q channel digital signals, the digital processing circuitry deriving the further signal as second I and Q channel digital signals, the digital processing circuitry combining the first I and Q channel signals and the additional signal to derive the second I and Q channel signals in accordance with a CORDIC function.

8. The demodulator of claim 7 wherein the control for the relative timing of sampling of the symbols by the converter means is in response to the further signal.

9. The demodulator of claim 1 wherein the digital processing circuitry and the digitally controlled phase shifter are on a single integrated circuit chip.

10. The demodulator of claim 9 further including variable gain means for controlling the amplitude of the signal sampled by the converter means, the digital processing circuitry on the chip including a one-bit sigma-delta modulator responsive to the digital output for deriving a control signal for the gain of the variable gain means.

11. The demodulator of claim 1 wherein the analog-to-digital converter means has a structure for sampling only at rates less than two times the symbol rate, the symbol rate and the type of analog-to-digital converter means being such that the cost of a comparable analog-to-digital converter means that samples the signal at twice the symbol rate is at least approximately 30% higher than the cost of the analog-to-digital converter means sampling only once per symbol.

12. A demodulator responsive to symbols having a symbol rate in an analog baseband signal comprising analog-to-digital converter means responsive to the signal for sampling the signal only once per symbol to derive a digital output, and digital signal processing circuitry responsive to the digital output of the converter means, the digital processing circuitry being responsive to indications of a function of the digital output derived by the converter means for deriving a digital change indicating signal used in adjusting the relative timing of when the baseband signal is to be sampled by the converter means, and means responsive to the digital change indicating signal to adjust the relative timing for supplying sampling pulses for the baseband signal to the converter means.

13. The demodulator of claim 12 wherein the supplying means includes a one-bit sigma-delta modulator and a voltage controlled variable frequency oscillator responsive to an output signal of the sigma-delta modulator.

14. The demodulator of claim 12 wherein the digital processing circuitry compares indications of a function of the values of the digital output derived by the converter means for consecutive symbols to derive the signal having a value indicative of a change to be made in the relative timing of when the signal is to be sampled by the converter means, the signal having a value indicative of a change to be made in the relative timing of when the signal is to be sampled by the converter means being a digital signal, and a digitally-controlled variable phase shifter responsive to the digital change indicating signal and clock pulses having approximately an integral multiple of the symbol rate for controlling when the converter means samples the signal.

15. The demodulator of claim 12 wherein the signal having a value indicative of a change to be made in the relative timing of when the signal is to be sampled by the converter means is a digital signal, the digital change indicating signal for one symbol period being derived as a function of (sign P(k)) P(k–1)+(–sign P(k–1)) P(k) where P(k) is an indication of the value of a sample taken by the converter means for symbol k, and P(k–1) is an indication of the value of the sample taken by the converter means for symbol (k–1).

16. The demodulator of claim 12 wherein the signal having a value indicative of a change to be made in the relative timing of when the signal is to be sampled by the converter means is a digital signal, the digital change indicating signal for one symbol period being derived by integrating over many symbols (sign P(k)) P(k–1)+(–sign P(k–1))P(k) where P(k) is an indication of the value of a sample taken by the converter means for symbol k, and P(k–1) is an indication of the value of the sample taken by the converter means for symbol (k–1).

17. The demodulator of claim 12 wherein the signal having a value indicative of a change to be made in the relative timing of when the signal is to be sampled by the converter means is a digital signal, and the baseband signal includes residual components due to frequency and phase errors between a carrier on which the baseband signal is imposed and a local frequency source, the converter means including first and second integrated circuit analog-to-digital converters for respectively deriving rotating $I_{in}$ and $Q_{in}$ digital signals, the $I_{in}$ and $Q_{in}$ signals rotating due to the frequency and phase errors, the digital processing circuitry being responsive to the $I_{in}$ and $Q_{in}$ digital signals for deriving derotated digital signals I and Q controlled by $I_{in}$ and $Q_{in}$ and an indication of the frequency and phase errors, the digital change indicating signal for one symbol period (k) being derived as a function of (sign I(k))I(k–1)+(–sign I(k–1))I(k)+(sign Q(k))Q(k–1)+(–sign Q(k–1))Q(k)
where I(k) is an indication of the value of I for symbol k I(k–1) is an indication of the value of I for symbol (k–1)

Q(k) is an indication of the value of Q for symbol k, and

Q(k–1) is an indication of the value of Q for symbol (k–1).

18. The demodulator of claim 12 wherein the signal having a value indicative of a change to be made in the relative timing of when the signal is to be sampled by the converter means is a digital signal, and the baseband signal includes residual components due to frequency and phase errors between a carrier on which the baseband signal is imposed and a local frequency source, the converter means including first and second integrated circuit analog-to-digital converters for respectively deriving rotating $I_{in}$ and $Q_{in}$ digital signals, the $I_{in}$ and $Q_{in}$ signals rotating due to the frequency and phase errors, the digital processing circuitry being responsive to the $I_{in}$ and $Q_{in}$ digital signals for deriving derotated digital signals I and Q controlled by $I_{in}$ and $Q_{in}$ and an indication of the frequency and phase errors, the digital change indicating signal for one symbol period (k) being derived by integrating over many symbols (sign I(k))I(k–1)+(–sign I(k–1))I(k)+(sign Q(k))Q(k–1)+(–sign Q(k–1))Q(k)
where I(k) is an indication of the value of I for symbol k I(k–1) is an indication of the value of I for symbol (k–1)

Q(k) is an indication of the value of Q for symbol k, and

Q(k–1) is an indication of the value of Q for symbol (k–1).

19. The demodulator of claim 12 wherein the analog-to-digital converter means has a structure for sampling only at rates less than two times the symbol rate, the symbol rate and the type of analog-to-digital converter means being such that the cost of a comparable analog-to-digital converter means that samples the signal at twice the symbol rate is at least approximately 30% higher than the cost of the analog-to-digital converter means sampling only once per symbol.

20. A demodulator responsive to symbols having a symbol rate in an analog baseband signal comprising analog-to-digital converter means responsive to the signal for sampling the signal only once per symbol to derive a digital output, and digital signal processing circuitry responsive to the digital output of the converter means, the baseband signal being derived by combining a wave modulated by a carrier with a local frequency source, the digital processing circuitry responding to the converter means to derive a further signal having a value corrected for differences in frequency and phase of the carrier and local frequency source.

21. The demodulator of claim 20 wherein the digital processing circuitry derives an additional signal having a value indicative of the correction for differences in frequency and phase of the carrier and local frequency source, the additional signal being fed back in the digital processing circuitry and combined with the digital output of the converter means to derive the further signal.

22. The demodulator of claim 21 wherein the analog-to-digital converter means derives the digital output as first I and Q channel signals, the digital processing circuitry deriving the further signal as second I and Q channel signals, the digital processing circuitry combining the first I and Q channel signals and the additional signal to derive the second I and Q channel signals in accordance with a CORDIC function.

23. The demodulator of claim 20 wherein the analog-to-digital converter means derives the digital output as first I and Q channel signals, the digital processing circuitry deriving the further signal as second I and Q channel signals, the digital processing circuitry combining the first I and Q channel signals and an additional signal to derive the second I and Q channel signals in accordance with a CORDIC function.

24. The demodulator of claim 20 wherein control for relative timing of sampling of the symbols by the converter means is in response to a function of the further signal.

25. The demodulator of claim 24 wherein the digital processing circuitry compares indications of a function of the values of the digital output derived by the converter means for consecutive symbols to derive a digital signal having a value indicative of a change to be made in the relative timing of when the signal is to be sampled by the converter means, and a digitally-controlled variable phase shifter responsive to the digital change indicating signal and clock pulses having approximately an integral multiple of the rate for controlling when the converter samples the signal.

26. The demodulator of claim 25 wherein the control for the relative timing of sampling of the symbols by the converter means is in response to the further signal.

27. The demodulator of claim 24 wherein the digital processing circuitry derives an additional signal having a value indicative of the correction for differences in frequency and phase of the carrier and local frequency source, the additional signal being fed back in the digital processing circuitry and combined with the digital output of the converter means to derive the further signal.

28. The demodulator of claim 27 wherein the analog-to-digital converter means derives the digital output as first I and Q channel signals, the digital processing circuitry deriving the further signal as second I and Q channel signals, the digital processing circuitry combining the first I and Q channel signals and the additional signal to derive the second I and Q channel signals in accordance with a CORDIC function.

29. The demodulator of claim 20 wherein the analog-to-digital converter means has a structure for sampling only at rates less than two times the symbol rate, the symbol rate and the type of analog-to-digital converter means being such that the cost of a comparable analog-to-digital converter means that samples the signal at twice the symbol rate is at least approximately 30% higher than the cost of the analog-to-digital converter means sampling only once per symbol.

30. A receiver for a modulated input signal having a carrier frequency $\omega_i$ comprising a local oscillator having a frequency $\omega_o$ nominally equal to $\omega_i$, means responsive to the input signal and the local oscillator for deriving I and Q channel baseband analog signals nominally phase displaced from each other by 90°, the I and Q channel baseband signals representing symbols at a symbol rate including residual components due to frequency and phase errors between the carrier and local oscillator frequencies and phases, first and second analog-to-digital converters for respectively sampling the I and Q channel baseband analog signals at a rate of only once per symbol and for deriving first I and Q channel digital signals having values determined by the values of the sampled I and Q analog signals, derotation means responsive to the first I and Q channel digital signals for deriving second I and Q channel digital signals having values corrected for the frequency and phase errors, means responsive to one of the I and Q channel digital signals for controlling when the analog-to-digital converters sample the I and Q channel baseband signals, and output means responsive to the second I and Q channel digital signals.

31. The receiver of claim 30 wherein the derotation means includes feedback means responsive to the second I and Q channel digital signals for deriving an additional digital signal indicative of the frequency and phase errors, the derotation means being responsive to the first I and Q digital signals and the additional signal to control the values of the second I and Q channel digital signals, the additional digital signal being derived directly by the feedback means and controlling derivation of the second I and Q channel digital signals without conversion to an analog signal.

32. The receiver of claim 30 wherein each of the analog-to-digital converters is an integrated circuit, the sampling and symbol rates and the type of each analog-to-digital converter integrated circuit being such that the cost of a comparable analog-to-digital converter integrated circuit that samples the symbols at twice the symbol rate is at least 30% higher than the cost of the analog-to-digital converter integrated circuit of the analog-to-digital converters.

33. The receiver of claim 32 wherein the symbol rate is approximately 15–35 million times per second.

34. The receiver of claim 30 wherein the means for controlling is responsive to the second I and Q channel digital signals.

35. The receiver of claim 30 wherein the local oscillator frequency is susceptible to considerable variation and is not controlled.

36. A demodulator responsive to symbols of an analog signal including residual components due to frequency and phase errors between a carrier on which the signal is modulated and a local frequency source, comprising means responsive to the analog signal for deriving first I and Q channel digital signals having values determined by sampled amplitudes, including the residual components, of the analog signal, and means responsive to the first I and Q channel digital signals for deriving second I and Q channel digital signals corrected for the frequency and phase errors and a third digital signal having a value representing the frequency and phase errors, the second I and Q channel digital signals being derived by combining the first I and Q channel digital signals and the third digital signal in accordance with a CORDIC function.

37. The demodulator of claim 36 wherein the symbols have a rate and the means for deriving the first digital signals samples the analog signal amplitude at approximately the symbol rate, and means responsive to at least one of the digital signals for controlling when the analog signal is sampled.

38. The demodulator of claim 36 wherein the symbols have a rate and the means for deriving the first digital signals samples the analog signal amplitude at approximately the symbol rate, and means responsive to at least one of the second digital signals for controlling when the analog signal is sampled only once during a symbol.

39. The demodulator of claim 36 wherein the symbols have a rate, the means for deriving the first I and Q channel digital signals comprising analog-to-digital converter means for sampling I and Q channel analog baseband signals only once by the converter means per symbol period, sampling times of the I and Q channel analog baseband signals being controlled in response to a function of at least one of the first and second I and Q channel digital signals.

40. The demodulator of claim 39 wherein the analog-to-digital converter means includes an integrated circuit analog-to-digital converter, the integrated circuit analog-to-digital converter being having a structure for sampling the symbols only at rates less than two times the symbol rate, the symbol rate and the integrated circuit analog-to-digital converter being such that the cost of a comparable analog-to-digital converter integrated circuit capable of sampling the symbols at twice the symbol rate is at least approximately 30% higher than the cost of said integrated circuit analog-to-digital converter.

41. The demodulator of claim 36 wherein the symbols have a rate, the means for deriving the first I and Q channel digital signals comprising analog-to-digital converter means for sampling I and Q channel analog baseband signals at approximately the rate so that each symbol is sampled only once by the converter means, sampling times of the I and Q channel analog baseband signals at the rate being controlled in response to the second I and Q channel digital signals.

42. The demodulator of claim 36 wherein the means for deriving the second I and Q channel digital signals derotates the first I and Q channel digital signals in accordance with the CORDIC function and includes a feedback loop for adjusting the value of the third digital signal by digital signal processing of the second I and Q channel digital signals.

43. A receiver responsive to an input signal including symbols modulated on a carrier frequency comprising a local frequency source having an output with a nominal frequency susceptible to variation from a set value therefor, means for combining the input signal and the output of the local source and for deriving first I and Q channel digital signals having values determined by the modulation and by the frequencies and phases of the carrier and the local source, and means responsive to the first I and Q channel digital signals for deriving second I and Q channel digital signals and a third digital signal having a value determined by the relative frequency and phase of the carrier and the local source, the second I and Q channel digital signals having values that are compensated for the deviation of the local source nominal frequency from the set value therefor, the second I and Q channel digital signals being derived by combining the first I and Q channel digital signals and the third digital signal in accordance with a CORDIC function.

44. A demodulator responsive to symbols of an analog signal, the symbols having a rate, comprising analog-to-digital converter means responsive to the analog signal for sampling the analog signals at approximately the rate so that the signal is sampled only once per symbol and for deriving first I and Q channel digital signals having values determined by the sampled amplitudes of the analog signal, means responsive to the first I and Q channel digital signals for deriving second I and Q channel digital signals and a third digital signal having a value representing frequency and phase corrections to be made to the first I and Q channel digital signals, the second I and Q channel digital signals having values that are compensated by the value of the third digital signal, and a variable digital phase shifter having a first input responsive to one of the first and second digital signals and a second input responsive to clock pulses having approximately the rate for controlling sampling times by the analog-to-digital converting means of the signal at approximately an integral multiple of the rate so that as the value at the first input of the phase shifter changes the sampling times change.

45. The demodulator of claim 44 wherein the second I and Q channel digital signals are derived by combining the first I and Q channel digital signals and the third digital signal in accordance with a CORDIC function.

46. The demodulator of claim 44 wherein the analog-to-digital converter means samples I and Q channel analog signals at approximately the rate so that each symbol is sampled only once by the converter means at approximately the rate, sampling times of the I and Q channel analog signals being controlled in response to at least one of the second I and Q channel digital signals.

47. The demodulator of claim 46 wherein the analog-to-digital converter means is included on an integrated circuit, the analog-to-digital converter means having a structure for sampling the symbols only at rates less than two times the symbol rate, the symbol rate and the analog-to-digital converter means being such that the cost of a comparable analog-to-digital converter integrated circuit means capable of sampling the symbols at twice the rate is at least approximately 30% higher than the cost of said integrated circuit analog-to-digital converter means.

48. The demodulator of claim 44 wherein the variable digital phase shifter and a means for combining the first I and Q digital signals and the third digital signal are included on a single integrated circuit chip.

49. The demodulator of claim 48 further including variable gain means for controlling the amplitude of the signal sampled by the analog-to-digital converter means, the integrated circuit chip including digital processing circuitry responsive to at least one of the I and Q channel digital signals for deriving a control signal controlling the gain of the variable gain means.

50. The demodulator of claim 49 wherein the digital processing circuitry for deriving the gain control signal includes a one-bit sigma-delta modulator.

51. The demodulator of claim 44 wherein the first input is responsive to a comparison of indications of a function of the values of the at least one of said digital signals for differing samples (k) and (k−1) taken by the converter means, the first input being derived as a function of (sign P(k)) P(k−1)+(−sign P(k−1)) P(k)
where
P(k) is the value of an indication of a sample taken by the converter means for symbol k, and
P(k−1) is the value of the indication of the sample taken by the converter means for symbol (k−1).

52. The demodulator of claim 44 wherein the first input is responsive to a comparison of indications of values of the second I and Q digital signals for differing samples (k) and (k−1) taken by the converter means, the first input being derived as a function of (sign I(k))I(k−1)+(−sign I(k−1))I(k)+(sign Q(k))Q(k−1)+(−sign Q(k−1))Q(k)
where
I(k) is the value of an indication of I for symbol k
I(k−1) is the value of the indication of I for symbol (k−1)
Q(k) is the value of the indication of Q for symbol k, and
Q(k−1) is the value of the indication of Q for symbol (k−1).

53. The demodulator of claim 44 wherein the analog signal is derived by combining a carrier having a frequency on which the analog signal is modulated with a local source output having a nominal frequency susceptible to variation from a set value therefor, the first I and Q channel digital signals having values determined by the modulation and the relative frequency and phase of the carrier and the local source, the third digital signal value representing the relative frequency and phase of the carrier and the local source, the second I and Q channel digital signals having values that are compensated for the deviation of the local source nominal frequency from the set value therefor.

54. The demodulator of claim 44 wherein the first input is responsive to both of said second digital signals.

55. A receiver for a modulated input signal having a carrier frequency $x_i$ comprising a local oscillator having a frequency $x_o$ nominally equal to $x_i$; the input signal having phase variations as a function of modulation information; means responsive to the input signal and the local oscillator for deriving I and Q channel baseband analog signals nominally phase displaced from each other by 90°, the baseband analog signals including symbols having a rate, the I and Q channel baseband signals including residual components due to frequency and phase errors between the carrier and local oscillator frequencies and phases, first and second analog-to-digital converters for respectively sampling the I and Q channel baseband analog signals at a rate of only once per symbol and for deriving first I and Q channel digital signals having values determined by the values of the sampled I and Q analog signals, derotation means responsive to the first I and Q channel digital signals for deriving a digital indication of the phase variations corrected for the frequency and phase errors, means responsive to at least one of the digital signals for controlling when the analog-to-digital converters sample the I and Q channel baseband signals, and output means responsive to the digital indication.

56. The receiver of claim 55 wherein the means for controlling is responsive to the digital indication.

57. The receiver of claim 56 wherein the derotation means includes feedback means responsive to the digital indication for deriving an additional digital signal indicative of the frequency and phase errors, the additional digital signal being derived directly by the feedback means and controlling derivation of the digital indication without conversion to an analog signal.

58. The receiver of claim 55 wherein the derotation means includes feedback means responsive to the digital indication for deriving an additional digital signal indicative of the frequency and phase errors, the additional digital signal being derived directly by the feedback means and controlling derivation of the digital indication without conversion to an analog signal.

59. The receiver of claim 55 wherein each of the analog-to-digital converters is an integrated circuit, the sampling and symbol rates and the type of each analog-to-digital converter integrated circuit being such that the cost of a comparable analog-to-digital converter integrated circuit that samples the symbols at twice the rate is at least 30% higher than the cost of the analog-to-digital converter integrated circuit of the analog-to-digital converter means.

60. A demodulator responsive to symbols of an analog signal including phase variations as a function of information, the symbols having a rate, comprising analog-to-digital converter means responsive to the analog signal for sampling the analog signal at approximately the rate so that the signal is samples only once per symbol and for deriving first I and Q channel digital signals having values determined by the sampled amplitudes of the analog signal, means responsive to the first I and Q channel digital signals for deriving a digital indication of the phase variations and a third digital signal having a value representing frequency and phase corrections to be made to the first I and Q channel digital signals, the value of the digital indication being compensated by the value of the third digital signal, and a variable digital phase shifter having a first input responsive to one of the digital signals and a second input responsive to clock pulses having approximately the rate for controlling sampling times by the analog-to-digital converting means of the signal at approximately an integral multiple of the rate so that as the value at the first input of the phase shifter changes the sampling times change.

61. The demodulator of claim 60 wherein the first input of the digital phase shifter is responsive to the digital indication.

* * * * *